United States Patent Office 3,371,131
Patented Feb. 27, 1968

3,371,131
ADDITION PHOSPHONATE POLYMERS AND PREPARATION THEREOF
Andrew Carson, Southampton, Wayne E. Feely, Rydal, and Marvin J. Hurwitz, Elkins Park, Pa., assignors to Rohm & Haas Company, Philadelphia, Pa., a corporation of Delaware
No Drawing. Filed Feb. 7, 1964, Ser. No. 343,223
19 Claims. (Cl. 260—931)

ABSTRACT OF THE DISCLOSURE

High molecular weight phosphonate polymers having a number average molecular weight of at least 5,000 are produced in a two reactant process. The two reactant process consists of reacting a cyclic chlorophosphite with an enolizable ketone in the temperature range of about $-70°$ to about $100°$ C. in an acid medium. The high molecular weight phosphonate polymers are used to impart flame-retardant properties to normally flammable polymeric materials.

---

This invention deals with specific addition phosphonate polymers as new compositions of matter. It further deals with a method for the preparation of these specific addition phosphonate polymers from two components, a specific cyclic halophosphite and a specific enolizable ketone, to be more fully defined hereinafter. It also deals with these specific addition phosphonate polymers as flame-retardant and flame-proofing additives in polymeric systems. In addition, it deals with these specific addition phosphonate polymers as flame-retardant and flame-proof plastics.

The addition phosphonate polymers of the present invention are characterized by the following repeating unit:

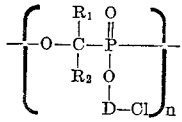

$R_1$ and $R_2$ each contain up to 12 carbon atoms and represent alkyl, phenyl, phenylalkyl, alkylphenyl, alkenyl and alkoxycarbonyl. $R_1$ and $R_2$, taken collectively with the carbon atom to which they are attached, form an aliphatic ring of 5 to 7 carbon atoms. This aliphatic ring may be saturated or mono-unsaturated. It is preferred that the total number of carbon atoms in $R_1$ plus $R_2$ be no greater than 17. It is, also, preferred that at least one of $R_1$ and $R_2$ represent alkyl.

The alkylphenyl embodiment of $R_1$ and $R_2$ may consist of one or more alkyl substituents on the phenyl ring, as desired, as long as the total carbon content is observed. Furthermore, when a phenyl ring is employed in $R_1$ or $R_2$, it may contain inert substituents, such as chlorine and the like. Such is within the scope of this invention.

D represents an alkylene group of 2 to 3 carbon atoms or the alkyl-substituted alkylene group wherein the alkylene portion contains 2 to 3 carbon atoms and the alkyl substituents total up to 8 carbon atoms.

The symbol $n$ is an integer of at least 10 such that the average molecular weight of the polymer is at least 5,000. The product is useful as a flame-retardant and flame-proofing agent for various polymer systems. Generally, polymers of this invention are, in addition, useful as flame-retardant and flame-proof products themselves.

The present addition phosphonate polymers are prepared by reacting, in a range of about $-70°$ C. to $100°$ C., preferably $-20°$ C. to $60°$ C., two components, an enolizable ketone with a cyclic chlorophosphite. The enolizable ketone reactant may be represented by the formula

wherein $R_2$ has the structure

and $R_1$ and $R_2$ have the significance discussed hereinbefore, although actually any ketone that will enolize will perform satisfactorily in the process of the present invention.

Addition polymers are referred to in this application in harmony with the definition given in Principles of Polymer Chemistry by Paul J. Flory, p. 37 et seq., 1953.

Typically, the ketone reactants include acetone, butanone, hexanone, heptanone, octanone, dodecanone, octadecanone, cyclopentanone, cyclohexanone, cycloheptanone, acetophenone, acetochlorophenone, phenylpropanone, chlorophenylpentanone, phenylpentanone, diphenylhexanone, phenyloctanone, phenyldodecanone, pentenone, hexenone, dodecenone, cyclopentenone, cyclohexenone, propenylpropanone, butenylpropanone, hexenylhexanone, octenylbutanone, methoxycarbonyl propanone, ethoxycarbonyl propanone, methoxycarbonyl butanone, butoxycarbonyl butanone, hexoxycarbonyl pentanone, octoxycarbonyl octanone, methoxycarbonyl pentenanone, pentoxycarbonyl octenone and octoxycarbonyl heptenone. These ketones can be used in any of their isomeric forms as long as they conform to the enolizable structure presented hereinbefore. Generally, only one ketone will be used in any one reaction but it is possible to employ mixtures of ketones, if desired. Such mixtures are within the gamut of this invention.

The chlorophosphite reactant may be represented by the formula

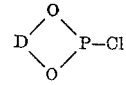

wherein D has the significance previously set forth. Typical embodiments of the halophosphite reactant include ethylene chlorophosphite, propylene chlorophosphite, trimethylene chlorophosphite, dimethylethylene chlorophosphite, propylethylene chloroposphite, dibutylethylene chlorophosphite, dimethylpropylene chlorophosphite, butylpropylene chlorophosphite, butyltrimethylene chlorophosphite, and diethyltrimethylene chlorophosphite.

Generally, the chlorophosphite will be used as such, but in many instances it is desirable to prepare the chlorophosphite in situ by the reaction of the suitable glycol with phosphorus trichloride. The ketone is then added thereto. It is possible to incorporate bromine into the polymer, if desired, by using initially a chlorophosphite and then introducing hydrogen bromide into the reaction medium.

The present reaction may be conducted without a solvent, but there may be used an inert, volatile, organic solvent in order to expedite the reaction and provide a medium in which the stability of the product is not adversely affected. Typical solvents include esters, such as methyl methacrylate and ethyl acetate; chlorinated aliphatic compounds, such as methylene chloride and ethylene chloride; and aromatic hydrocarbons, such as xylene, benzene and toluene.

The reaction is conducted in an acid medium which is created by the addition of an acid itself or a compound that generates acid from the chlorophosphite reactant. These include water, methanol, ethanol, hydrochloric acid, sulfuric acid, or Lewis acids, such as boron trifluoride and the like.

The present reaction is conducted by adding either reactant to the other and introducing the catalyst along with either reactant, or both reactants and catalyst may be introduced substantially simultaneously into the reaction vessel. It is preferred to add the ketone to a solution of the chlorophosphite and catalyst. Under some conditions, it is further preferred to add the ketone gradually and more particularly at a rate substantially that of the rate of reaction. An excess of ketone, generally 5 to 15% being sufficient for maximum yields, may be employed, if desired. Greater excesses of ketone, such as above about 25%, are generally to be avoided, since in the presence of so much excess ketone undesirable side reactions may take place.

The addition phosphonate polymer product is substantially transparent and ranges from colorless to straw-yellow liquids to glassy solids. Particularly preferred are those that are thermally stable at least up to about 140° C. The reaction is usually conducted in the presence of a solvent, as mentioned hereinbefore, and it is quite convenient to use the solid product in the reaction solution. The solution may be incorporated into the contemplated polymer system and the system stripped to remove solvent and unused reactants. This leaves the addition phosphonate polymer intimately incorporated in the desired polymer system, such as a foam resin which will ultimately yield either a flexible or rigid form or a polymer system which will ultimately yield decorative and structural plastic members.

The solution of addition phosphonate polymer may also be incorporated into a monomer, such as methyl methacrylate or styrene or the like, or into a syrup consisting of a partially polymerized monomer or consisting of a solution of a polymer in monomer and the system stripped to remove solvent. The resulting mixture may then be converted by conventional means to polymerized plastic materials containing the addition phosphonate polymer.

The solution of addition phosphonate polymer may also be stripped of solvent by conventional means, such as spray drying, vacuum drying, or the like to give the solid addition phosphonate polymer.

The solid addition phosphonate polymer may also be obtained from the solution by precipitation by an anti-solvent, such as hexane or cyclohexane.

The solid addition phosphonate polymer may be obtained by preparing it directly in bulk or by preparing it in emulsion, suspension or dispersion or by precipitation techniques and isolating the solid by spray drying, filtration or other known methods.

The solution of addition phosphonate polymer may be added to an emulsion, suspension, dispersion, or solution of a resin to give a new emulsion, suspension, dispersion or solution of the resin. Also, the addition phosphonate polymer or the solution of addition phosphonate polymer may be converted to an emulsion, suspension or dispersion which may be added to a monomer or polymer, as mentioned previously, to give the new composition.

The solid addition phosphonate polymer may be incorporated with other resins by dry blending, by hot melting, by dissolution, by extrusion molding or in solvents, emulsions, suspensions or dispersions, as desired, to give novel and valuable compositions.

The products of this invention that are oil-soluble may be directly incorporated into lubricants where they impart flame-resistant, load-bearing, sludge dispersant, and oxidation-resistant properties. The phosphonate polymers are also useful as anti-icing and anti-knock additives in distillate fuels. Perhaps the outstanding attribute of the present products is that they impart into foam or other plastic systems, such as acrylic systems, flame-resistant and substantial flame-proofing characteristics. This is, of course, of great value in situations where safety, with respect to flame proofing, is required, such as in structural units for the building industry. The present addition phosphonate polymers are especially valuable in providing transparent, weather-resistant and flame-resistant structural building members. Outstanding in this respect are the polymers that have molecular weights of about 5000 to about 65,000, and especially those in which the enolizable ketone reactant is acetone or cyclohexanone.

If desired, the acid number of the addition phosphonate polymers may be lowered by the addition of an inorganic base, such as soda ash, lime, sodium hydroxide and the like or an organic base, such as amines, epoxides, and the like. Also, the acid number of the addition polyphosphonate polymers may be lowered by washing with dilute caustic solution, dilute sodium bicarbonate solution and the like. The acid number may also be lowered by treatment with a basic ion-exchange resin.

The present invention may be more fully understood from the following examples which are offered by way of illustration and not by way of limitation. Parts by weight are used throughout.

*Example 1.—Ethylene chlorophosphite and acetone*

A solution of 1487 parts of ethylene chlorophosphite in 2000 parts of methylene dichloride is charged to a 5-liter flask equipped with a stirrer, thermometer, reflux condenser and provision for maintenance of a nitrogen atmosphere in the flask. Over a one-hour period, there is gradually added to this solution a total of 852 parts of acetone to which has been added 2 parts of water. A moderate exotherm is observed for a three-hour period following completion of the acetone addition. This is controlled at, or slightly below, the reflux point by occasional cooling. When no further sign of an exothermic reaction is evident, the solution is heated and stirred at reflux. A progressive thickening is observed in the solution which remains completely clear and colorless at all times. During the reaction, samples of the solution are removed, dissolved in methyl alcohol and titrated with base to determine acid values on the solution. A gradual decrease in acidity is observed for the solution.

| Time (in hours): | Acid value (mg. KOH per gram of solution) |
| --- | --- |
| 6 | 13.0 |
| 19 | 4.8 |
| 40 | 2.2 |

A sample of the final polymer is isolated by evaporation of a portion of the solution to dryness. The polymeric solid is powdered and further held under a vacuum of less than 1 mm. for 20 hours to ensure removal of volatile materials. A number average molecular weight of 12,000 is found for the sample of product thus isolated.

The above reaction is repeated except that the initial 19 hours of reaction are run at 0° to 20° C. instead of at reflux. The product has a number average molecular weight of 18,000.

*Example 2.—Ethylene chlorophosphite and acetone*

Ethylene glycol (23.7 parts) is added to a solution of 51 parts of phosphorus trichloride in 47 parts of methylene dichloride at a rate which gives a controllable rate of hydrogen chloride evolution. The mixture is then distilled to remove most of the remaining hydrogen chloride and about 5 parts of methylene dichloride. The mixture is cooled to 25° C. and 21.8 parts of acetone is added over a four-hour period. An exothermic reaction is observed which generates enough heat to cause reflux during the acetone addition. The mixture is then heated at reflux for 16 hours after which it has an acid number based on polymer solids of 10. Treatment of a portion of the material with a stoichiometric amount of ethylene oxide lowers the acid number based on polymer solids to 3.1. An isolated sample of the polymer has a molecular weight of 4100.

Example 3.—Ethylene chlorophosphite and acetone

A solution of 252 parts of ethylene chlorophosphite in 158 parts of methyl methacrylate is stirred at 70° C. under a nitrogen atmosphere. To this there is added gradually over a one-hour period, 174 parts of acetone, the reaction temperature being maintained at 70° C. by occasional cooling. The mixture is then heated and stirred at 80° C. for six hours. At the end of this period, the acid number (mg. KOH per gram of sample) of the solution is 5.5. When diluted with additional methyl methacrylate to give a 50% polymer concentration, the resulting solution has a Gardner-Holdt viscosity of C at 25° C.

Example 4.—Ethylene chlorophosphite and acetone

Ethylene chlorophosphite (343 parts) and acetone (174 parts) containing 1.3 parts of ethyl alcohol are combined and stirred at room temperature. An exothermic reaction ensues, the temperature of the reaction mixture rising to 130° C. after 90 minutes. Stirring is discontinued when the exotherm abates and the mixture is heated on a steam bath for 70 hours. At the end of this period, the product is stirrable only with great difficulty. To remove residual volatile matter, the material is stripped under 1 mm. vacuum at 100° to 120° C. The stripped polymer shows the following properties:

Phosphorus _____ percent__ 17.8
Chlorine _____ do____ 19.3
Number average molecular weight _____ 4150

Example 5.—Ethylene chlorophosphite and acetone

Acetone (58 parts) is gradually added over a one-hour period to 126 parts of ethylene chlorophosphite and 4.5 parts of ethyl alcohol in 184 parts of benzene. The exothermic mixture reaches a peak temperature of 75° C. The mixture is stirred and heated on a steam bath for an additional period of three hours. The solvent is removed at 100° C. under a vacuum of 1 mm. The resulting very viscous polymer is cooled and powdered. It has an acid number (mg. KOH per gram of polymer) of 5.

Example 6.—Ethylene chlorophosphite and methyl hexyl ketone

Ethylene chlorophosphite (161 parts) is charged to a 1-liter flask equipped with a stirrer, thermometer and reflux condenser. A nitrogen atmosphere is maintained over the chlorophosphite. Methyl hexyl ketone (164 parts) and 5.9 parts of ethyl alcohol are added gradually over a 90-minute period. Sufficient cooling is applied to hold the temperature at 50° C. At the end of the addition, the viscous mixture is heated and stirred at 100° C. for three hours, then held under a pressure of 0.3 mm. for 90 minutes. A yield of 305 parts of colorless, very viscous polymer is obtained. The following analytical data are obtained on the polymeric product:

Phosphorus _____ percent__ 12.6
Chlorine _____ do____ 13.6
Number average molecular weight _____ 1857
Acid number (mg. KOH per gram of sample) ____ 25.5

Example 7.—Ethylene chlorophosphite and diethyl ketone

Ethylene chlorophosphite (63 parts) and diethyl ketone (86 parts) are combined with stirring. A gradual exothermic heat of reaction is observed causing the temperature to rise to 39° C. after which the mixture is heated to 100° C. for two hours. The mixture is then stripped at 110° C. under 10 mm. pressure until no further distillate can be removed. The phosphonate polymer residue (94 parts) is a light yellow oil.

Example 8.—1,2-propylene chlorophosphite and acetone

To a stirred solution of 246 parts of 1,2-propylene chlorophosphite in 322 parts of methylene dichloride, held under a nitrogen atmosphere, there is added over a one-hour period, 127 parts of acetone containing 0.3 part of water. Stirring is continued for a one-hour period, during which time the temperature of the mixture rises spontaneously from 32° to 39° C. The mixture is then heated and stirred at the reflux point for a total of 100 hours. A sample of the resulting polymer is isolated by evaporation of a portion of the solution to dryness. The polymeric solid is powdered and further held under a vacuum of less than 1 mm. for 20 hours to ensure removal of volatile matter. The following data are obtained on the polymer thus isolated:

Acid number (mg. KOH per gram of sample) _____ 4.0.
Number Average molecular weight _ 4190.
Viscosity (as a 50% solution in methyl isobutyl ketone) _____ G (Gardner-Holdt Scale at 25° C.).

Example 9.—1,3-propylene chlorophosphite and acetone

To a stirred solution of 130 parts of 1,3-propylene chlorophosphite in 170 parts of methylene dichloride, held under a nitrogen atmosphere, there is added over a one-hour period, 67 parts of acetone containing 0.5 part of water. Reaction is completed in a manner similar to that of Example 8. The final colorless, viscous solution has an acid value of 5 mg. KOH per gram of solution.

Example 10.—1,3-butylene chlorophosphite and acetone

Acetone (79 parts) containing 0.6 part of water is added over a 30-minute period to a stirred, nitrogen-blanketed solution of 169 parts of 1,3-butylene chlorophosphite in 216 parts of methylene dichloride. The mixture is then heated and stirred at the reflux temperature for a total of 100 hours. The resulting colorless, viscous solution has an acid value of 2 (mg. KOH per gram of sample). A portion of the solution is evaporated to dryness to provide a sample of solid polymer. This is powdered and further held under a vacuum of less than 1 mm. for 20 hours to ensure removal of volatile material. The solid phosphonate polymer thus isolated has a number average molecular weight of 3720.

Example 11.—Ethylene chlorophosphite and ethyl acetoacetate

A mixture of 286 parts of ethyl acetoacetate and 10 mole percent ethanol is stirred at 40° to 50° C. while 225 parts of ethylene chlorophosphite is added. The mixture is heated on a steam bath for two hours and then stripped at less than 1 mm. pressure to remove volatile components. The residue, which is an addition phosphonate polymer of this invention, has an acid number of 36.5 and a molecular weight of 1388. The product contains 12.2% phosphorus (theoretical 11.9%) and 13.7% chlorine (theoretical 13.6%).

Example 12.—Ethylene chlorophosphite and allylacetone

A mixture of 225.4 parts of allyl acetone and 10.6 parts of ethanol is stirred while 290 parts of ethylene chlorophosphite is added at 40° to 50° C. The mixture is heated for two hours on a steam bath, after which it has an acid number of 19.7. The phosphonate polymer product contains 13.8% phosphorus (theoretical 14.0%) and 15.8% chlorine (theoretical 17.1%).

Example 13.—Ethylene chlorophosphite and cyclohexanone

Redistilled cyclohexanone (323.4 parts) is added with stirring to a mixture of 379.5 parts of ethylene chlorophosphite in 644.1 parts of methylene dichloride over a one-hour period while the temperature of the mix is maintained at 0° to 1° C. The mixture is stirred at 0° to 6.5° C. for six hours, from 6.5° to 23° C. over 16 hours and at 48° C. for four hours, after which it has an acid number based on polymer solids of 4.31. A sample of the polymer solid, isolated by evaporating the solvent and excess cyclohexanone under vacuum, melts about 120° C.

*Example 14.—Ethylene chlorophosphite and acetophenone*

Two moles of ethylene chlorophosphite and 2.02 moles of acetophenone containing 10 mole percent of ethanol are mixed. An exothermic heat of reaction occurs causing a rise in temperature to 45° to 55° C. at which temperature it is maintained by cooling. The mixture becomes viscous indicating that polymerization is taking place.

We claim:
1. An addition phosphonate polymer having a number average molecular weight of at least about 5,000 comprising the repeating unit:

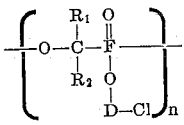

in which $n$ is an integer of at least 10,

D is a member from the class consisting of alkylene of 2 to 3 carbon atoms having a terminal carbon atom bonded to a chlorine atom, $R_1$ and $R_2$, taken individually, each contain up to 12 carbon atoms and are members from the class consisting of alkyl, phenyl, phenylalkyl, alkylphenyl, alkenyl and alkoxycarbonyl, and $R_1$ and $R_2$, taken collectively with the carbon atom to which they are attached, form a member from the class consisting of saturated and monounsaturated aliphatic rings of 5 to 7 carbon atoms, said $R_2$ having the structure

2. An addition phosphonate polymer according to claim 1 wherein
$R_1$ and $R_2$ represent alkyl and
D represents alkylene of 2 to 3 carbon atoms.

3. An addition phosphonate polymer according to claim 1 wherein
D is alkylene of 2 to 3 carbon atoms,
$R_1$ is phenylalkyl and
$R_2$ is alkyl.

4. An addition phosphonate polymer according to claim 1 wherein
D represents alkylene of 2 to 3 carbon atoms,
$R_1$ is phenyl and
$R_2$ is alkyl.

5. An addition phosphonate polymer according to claim 1 wherein
D represents alkylene of 2 to 3 carbon atoms,
$R_1$ is alkenyl and
$R_2$ is alkyl.

6. An addition phosphonate polymer according to claim 1 wherein
D represents alkylene of 2 to 3 carbon atoms,
$R_1$ is alkoxycarbonyl and
$R_2$ is alkyl.

7. An addition phosphonate polymer according to claim 1 wherein
$R_1$ and $R_2$ are methyl and
D is ethylene.

8. An addition phosphonate polymer according to claim 1 wherein
$R_1$ and $R_2$ are methyl and
D is propylene.

9. An addition phosphonate polymer according to claim 1 wherein
D is ethylene,
$R_1$ is phenyl and
$R_2$ is methyl.

10. An addition phosphonate polymer according to claim 1 wherein
D is ethylene and
$R_1$ and $R_2$, collectively with the carbon atom to which they are attached, are cyclohexyl.

11. The method for the preparation of an addition phosphonate polymer having a number average molecular weight of at least about 5,000 comprising the repeating unit:

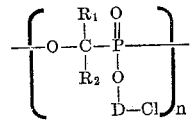

in which $n$ is an integer of 2 to about 10,000,

D is a member from the class consisting of alkylene of 2 to 3 carbon atoms having a terminal carbon atom bonded to a chlorine atom, $R_1$ and $R_2$, taken individually, each contain up to 12 carbon atoms and are members from the class consisting of alkyl, phenyl, phenylalkyl, alkylphenyl, alkenyl and alkoxycarbonyl, and $R_1$ and $R_2$, taken collectively with the carbon atom to which they are attached, form a member from the class consisting of saturated and monounsaturated aliphatic rings of 5 to 7 carbon atoms, said $R_2$ having the structure

consisting of reacting the chlorophosphite having the formula

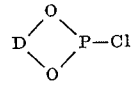

with at least one enolizable ketone having the formula

in the temperature range of about −70° to 100° C.

12. The method according to claim 11 wherein the reaction temperature is about −20° to about 60° C.

13. The method according to claim 11 wherein the chlorophosphite is prepared in situ prior to the addition of the ketone.

14. The method according to claim 11 wherein the reaction is conducted in the presence of an inert, volatile, organic, solvent.

15. The method according to claim 11 wherein the chlorophosphite is ethylene chlorophosphite and the enolizable ketone is acetone.

16. The method according to claim 11 wherein the chlorophosphite is ethylene chlorophosphite and the enolizable ketone is methyl hexyl ketone.

17. The method according to claim 11 wherein the chlorophosphite is ethylene chlorophosphite and the enolizable ketone is ethyl acetoacetate.

18. The method according to claim 11 wherein the chlorophosphite is ethylene chlorophosphite and the enolizable ketone is acetophenone.

19. The method according to claim 11 wherein the chlorophosphite is ethylene chlorophosphite and the enolizable ketone is cyclohexanone.

References Cited

UNITED STATES PATENTS 3,014,954  12/1961  Birum _____ 260—931
3,058,941  10/1962  Birum _____ 260—931 X
3,014,944  12/1961  Birum _____ 260—972

CHARLES B. PARKER, *Primary Examiner.*

A. H. SUTTO, *Assistant Examiner.*

UNITED STATES PATENT OFFICE
CERTIFICATE OF CORRECTION

Patent No. 3,371,131  February 27, 1968

Andrew Carson et al.

It is certified that error appears in the above identified patent and that said Letters Patent are hereby corrected as shown below:

Column 7, lines 13 to 19, that portion of the formula reading

—O—C—F—   should read   —O—C—P—

Signed and sealed this 7th day of October 1969.

(SEAL)
Attest:

Edward M. Fletcher, Jr.
Attesting Officer

WILLIAM E. SCHUYLER, JR.
Commissioner of Patents